(12) United States Patent
Reynes et al.

(10) Patent No.: US 8,591,721 B2
(45) Date of Patent: Nov. 26, 2013

(54) PROCESS FOR MIXED CHEMICAL/ELECTROCHEMICAL TREATMENT OF A LIQUID MEDIUM LOADED WITH NITRATES, A DEVICE FOR TREATING SUCH A LIQUID MEDIUM AND APPLICATIONS

(75) Inventors: Michel Reynes, Castelginest (FR); Dimiter Hadjiev, Lorient (FR)

(73) Assignee: Firmus S.A.M., Monaco (MC)

( * ) Notice: Subject to any disclaimer, the term of this patent is extended or adjusted under 35 U.S.C. 154(b) by 745 days.

(21) Appl. No.: 12/665,363

(22) PCT Filed: Jun. 19, 2008

(86) PCT No.: PCT/FR2008/051106
§ 371 (c)(1),
(2), (4) Date: Dec. 18, 2009

(87) PCT Pub. No.: WO2009/004257
PCT Pub. Date: Jan. 8, 2009

(65) Prior Publication Data
US 2010/0140106 A1   Jun. 10, 2010

(30) Foreign Application Priority Data

Jun. 19, 2007  (FR) ..................... 07 55851

(51) Int. Cl.
*B01D 61/44*  (2006.01)
*C02F 1/461*  (2006.01)
*C02F 1/469*  (2006.01)
*C25B 1/04*   (2006.01)

(52) U.S. Cl.
USPC ............ 205/742; 204/529; 205/552; 205/617

(58) Field of Classification Search
USPC ............... 204/242, 275.1, 523, 529, 634; 205/552, 617, 742; 210/748.01; 423/395, 398
See application file for complete search history.

(56) References Cited

U.S. PATENT DOCUMENTS

| | | | | |
|---|---|---|---|---|
| 4,250,144 A | * | 2/1981 | Ratigan | 422/112 |
| 4,397,719 A | | 8/1983 | Yoshida | |
| 4,830,717 A | | 5/1989 | Rignon et al. | |
| 4,861,441 A | * | 8/1989 | Saito et al. | 205/244 |
| 5,346,620 A | * | 9/1994 | Hendrix et al. | 210/605 |
| 5,376,240 A | * | 12/1994 | Kaczur et al. | 205/617 |
| 6,905,608 B2 | | 6/2005 | Reinhard | |

(Continued)

OTHER PUBLICATIONS

T. Mohammadi, M. Sadrzahed, A. Moheb, A. Razmi. "Zinc ion removal from wastewater by electrodialysis." Mar. 2005. Ninth International Water Technology Conference (IWTC9). pp. 1155-1163.*
K.H. Choi, T.Y. Jeoung. "Removal of zinc ions in wastewater by electrodialysis." Korean Journal of Chemical Engineering. Jan. 2002. Volumne 19, Issue 1. pp. 107-113.*

(Continued)

*Primary Examiner* — Keith Hendricks
*Assistant Examiner* — Steven A. Friday
(74) *Attorney, Agent, or Firm* — Westerman, Hattori, Daniels & Adrian, LLP (57) ABSTRACT

The invention relates, in particular, to a process for treating a liquid medium loaded with nitrates via a chemical route that mainly comprises a step of electrolysis of the liquid medium in the presence of a metal salt, the electrolysis being carried out at a pH below 5. The invention also relates to a device for treating a liquid medium loaded with nitrates and also to the applications of this process and device, in particular for reducing the level of nitrates in drainage waters.

18 Claims, 5 Drawing Sheets

(56) References Cited

U.S. PATENT DOCUMENTS

| | | |
|---|---|---|
| 7,241,373 B2 | 7/2007 | Hiro et al. |
| 2004/0195110 A1* | 10/2004 | Emesh et al. .................. 205/652 |
| 2007/0012631 A1* | 1/2007 | Coffey et al. .................. 210/743 |
| 2007/0108134 A1 | 5/2007 | Hadjiev et al. |
| 2009/0014337 A1 | 1/2009 | Clarke et al. |

OTHER PUBLICATIONS

E. Veschetti, B. Cittadini, D. Maresca, G. Citti, M. Ottaviani. "Inorganic by-products in waters disinfected with chlorine dioxide." Microchemical Journal. Jan. 2005. vol. 79. pp. 165-170.*

* cited by examiner

PROCESS FOR MIXED CHEMICAL/ELECTROCHEMICAL TREATMENT OF A LIQUID MEDIUM LOADED WITH NITRATES, A DEVICE FOR TREATING SUCH A LIQUID MEDIUM AND APPLICATIONS

FIELD OF THE INVENTION

The present invention relates to a method for mixed chemical electrochemical treatment of a liquid medium loaded with nitrates.

The invention also relates to a device for treating such a liquid medium and to the applications of this method.

BACKGROUND OF THE INVENTION

Liquid effluents resulting from the draining of culture soils are subject to regulations aiming at reducing the number of pollutants contained in these effluents.

Among these pollutants, nitrates are more particularly targeted.

Within the scope of hydroponic tomato cultures in green houses for example, the liquid effluents from the draining waters may contain a nitrate concentration ranging up to 3 g/L for a maximum flow rate of 31 $m^3$/day/hectare.

Now, discharging these waters is harmful for the environment, the maximum nitrate concentration for the environment may be estimated to be 50 mg/L.

A biological treatment of these effluents is possible but has two major drawbacks, i.e. the presence of organic compounds not easily biodegradable in the effluents, the requirement of a significant addition of methanol as well as the presence of microorganisms which is not very desirable in proximity to the culture location.

In this context, the invention is directed to a method for treating a liquid medium loaded with nitrates with which the nitrate concentration may be reduced and not requiring the use of polluting organic species, which may be detrimental to the environment. The invention also lies in a device with which a liquid medium loaded with nitrates may be treated and in the possible applications of the method of the invention.

For this purpose, the invention relates to a method for mixed chemical electrochemical treatment of a liquid medium loaded with nitrates.

SUMMARY OF THE INVENTION

According to the invention, this method comprises a step for electrolysis of the liquid medium in the presence of a metal salt, the electrolysis being conducted at a pH of less than 5.

Advantageously, the method comprises at least one step for forming an electrolytic solution by adding a metal salt to said liquid medium.

Preferably, the metal salt is a zinc metal salt.

In this case, the pH of the electrolytic solution is maintained between 2 and 5.

More specifically, the electrolysis step is conducted with an anode and a cathode in graphite or glassy carbon.

According to an alternative, the electrolysis step is conducted with a graphite anode and a cathode in solid zinc.

Additionally, the method comprises a step for electrodialysis of the solution at the electrolysis output, the electrodialysis being used in demineralization of this solution, in order to form an effluent demineralized in zinc metal salt, capable of being discharged.

In this case, the electrodialysis is also used in ionically concentrating the solution at the electrolysis output, in order to form an effluent which is concentrated in metal salt capable of being used as a source of metal salt for the electrolysis step in the presence of metal salt.

Preferably, the electrodialysis step is conducted at room temperature.

It is possible that the method comprises a step for recycling the effluent which is concentrated in metal salt right up to an enclosure in which the liquid medium undergoes the electrolysis step in the presence of metal salt.

Additionally, the method comprises a step for oxidizing the ammonium ions of the liquid at the electrolysis output, by which a nitrate-rich effluent is obtained, intended to be treated by electrolysis in the presence of a metal salt.

In this case, the step for oxidizing the ammonium ions is conducted with chlorine dioxide $ClO_2$ as an oxidizing agent.

More specifically, the pH of the liquid undergoing the step for oxidizing the ammonium ions is an acid pH.

According to another feature, the method comprises a step for recycling the nitrate-rich effluent right up to an enclosure in which this liquid undergoes the electrolysis step in the presence of a metal salt.

According to a second embodiment, the method comprises a series of steps for electrolysis of the liquid medium in the presence of a metal salt of a transition metal, and of steps for oxidizing the medium in the presence of an oxidizing agent, steps alternating with each other, the first step imposed to the medium being an electrolysis step.

In this case, each electrolysis step and each oxidation step are conducted within an electrolysis compartment and an oxidation compartment respectively, and an electrolysis compartment is located below an oxidation compartment, the gas species produced within an electrolysis compartment being absorbed by the liquid contained in the overlying oxidation compartment, the passage the medium to be treated being accomplished from the lowest electrolysis compartment right up to the highest oxidation compartment.

According to another feature, the method comprises a step for electrodialysis of the medium flowing out from the series of compartments by which a metal salt enriched solution and a metal salt depleted solution are formed.

Advantageously, the method comprises a step for recycling the solution enriched in metal salt to the inlet of the first electrolysis compartment.

Preferably, the method comprises a step for determining the number of <<electrolysis compartment/oxidation compartment>> pairs depending on the nitrate ion concentration of the medium to be treated.

The invention also relates to a device for treating via a chemical route a liquid medium loaded with nitrates. This device comprises an electrolytic solution containing the medium to be treated mixed with a metal salt of a transition metal, an electrolysis enclosure receiving the electrolytic solution, a source for providing a medium loaded with nitrates, and means for controlling the pH of the electrolytic solution to below 5. This enclosure comprises an inlet for the liquid to be treated, an outlet for the treated liquid, a source for providing a metal salt, and a means for mixing the liquid medium to be treated with the metal salt of the source.

The metal salt is more particularly a zinc metal salt.

Advantageously, the device comprises means for controlling the metal salt concentration of the liquid passing through the enclosure.

Further, it comprises at least one pH controller so that the liquid passing through the electrolysis enclosure may be maintained at a pH of less than 5.

According to an alternative embodiment, this device comprises an electrodialyzer mounted at the outlet of the electrolysis enclosure and provided with a column for metal salt enrichment and a column for metal salt depletion connected to a conduit for discharging the treated liquid medium.

The column for metal salt enrichment is then connected to the inlet of the electrolysis enclosure and is used as a source for providing metal salt.

An improvement consists of providing the device with a unit for oxidizing an effluent loaded with ammonium ions mounted at the outlet of the electrolysis enclosure in order to oxidize the ammonium ions of the effluent into nitrate ions, the latter being intended to be treated within the electrolysis enclosure.

This oxidation unit comprises an inlet for the liquid communicating with the outlet of the electrolysis enclosure, an outlet for the liquid loaded with nitrate, an inlet for an oxidizing agent called chlorine dioxide ($ClO_2$), and a means for mixing the liquid passing through the oxidation unit with the oxidizing agent, the pH of the liquid passing through the oxidation unit being close to an acid pH.

The outlet for the liquid of the oxidation unit is then connected to the inlet of the electrolysis enclosure, with view to the mixed chemical electrochemical treatment of this liquid.

The invention also relates to the use of the method and of the device described above for treating any liquid medium loaded with nitrates.

In this use, the liquid medium is formed by draining waters of cultures.

The invention further relates to a method for treating via a chemical route a liquid medium loaded with ammonium ions, comprising at least one step for oxidizing ammonium ions.

This oxidation step is conducted by means of an oxidizer called chlorine dioxide ($ClO_2$).

The pH of the solution undergoing the step for oxidizing the ammonium ions is an acid pH.

The invention also relates for treating via a chemical route a liquid medium loaded with ammonium ions, comprising a unit for oxidizing ammonium ions.

The oxidation unit comprises an inlet for liquid loaded with ammonium ions, an outlet for liquid loaded with nitrate ions, an inlet for an oxidizing agent called chlorine dioxide ($ClO_2$), and a means for mixing the liquid to be treated with the oxidizing agent, the pH of the liquid passing through the oxidation unit being an acid pH.

According to a second embodiment of the device, the electrolysis enclosure comprises several electrolysis compartments, the oxidation unit comprises several oxidation compartments, the electrolysis and oxidation compartments being mounted in series and alternating with each other, the first compartment through which passes the medium to be treated being an electrolysis compartment.

Advantageously, the electrolysis and oxidation compartments are superposed onto each other so as to form a column for treating nitrates, the inflow of the medium to be treated being accomplished at the bottom of the column and the outflow at the top of the column, the last compartment crossed by the medium to be treated being an oxidation compartment.

According to a first alternative embodiment, an electrolysis compartment comprises two electrodes which appear as plates, positioned facing each other and located on either side of the axis of the column.

In this case, an oxidation compartment is delimited by two plates permeable to the medium, positioned perpendicularly to the axis of the column.

According to a second alternative embodiment, an electrolysis compartment comprises two electrodes which appear as plates, positioned facing each other and intersecting the axis of the column.

In this case, an oxidation compartment is delimited by the electrodes of the electrolysis compartments located above and below this oxidation compartment.

According to another feature, the device comprises a source for providing an oxidizing agent connected to each oxidation compartment through a tube opening out between the elements delimiting the relevant oxidation compartment.

Advantageously, each electrolysis compartment comprises a stirrer.

According to another feature, the device comprises an electrodialyzer mounted at the column outlet, and producing a metal salt enriched solution in and a metal salt depleted solution.

Preferably, the device comprises a conduit for recycling the solution enriched in metal salt towards the inlet of the column.

The invention finally relates to the use of the method and of the device above for treating any liquid medium loaded with ammonium ions.

BRIEF DESCRIPTION OF DRAWING FIGURES

The invention will better understood and other objects, advantages and features of the latter will become more clearly apparent upon reading the description which follows and which is made with reference to the appended drawings wherein.

DETAILED DESCRIPTION

1. First Embodiment of the Treatment Device

Figure 1:
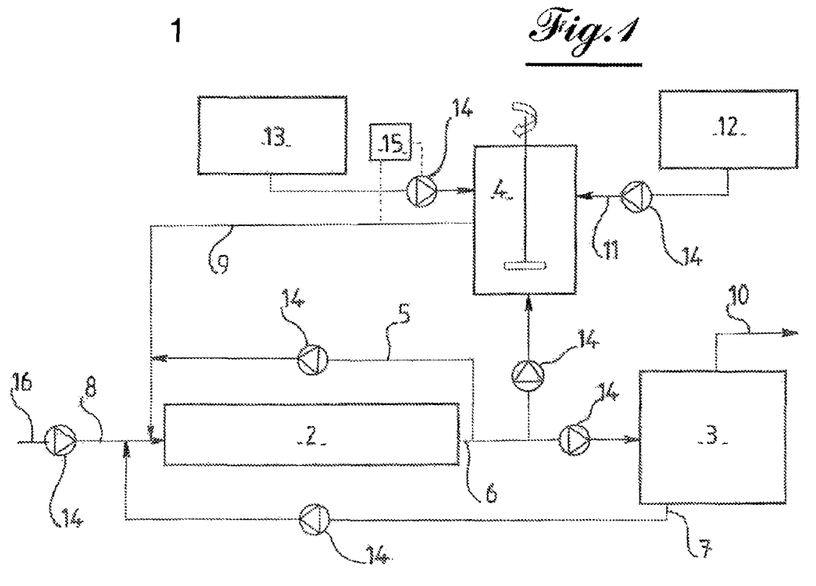
FIG. 1 is a block diagram of a first embodiment of a device for treating via a mixed chemical electrochemical route a liquid medium loaded with nitrates according to the invention.

In FIG. 1, a first embodiment of a device is illustrated for treating via a mixed chemical electrochemical route a liquid medium loaded with nitrates according to the invention.

This device 1 mainly comprises an electrolysis enclosure 2 using a metal in ionic form in order to reduce the nitrate concentration of the medium to be treated at a low pH.

The metal is selected according to its capability of yielding electrons and of catalyzing the reduction of the nitrate ions.

The transition metals are particularly suitable for these applications, and notably those in the rightmost columns of the Mendeldeïev Table.

Experimental studies have shown that zinc had significant catalytic power in reducing nitrates. It is therefore this metal which will be used within the device according to the invention.

It is introduced in ionic form even before the beginning of the electrolysis, as a reaction initiator.

In order to do this, a working solution is formed by mixing the medium to be treated with a solution enriched with zinc ions.

This solution is introduced at the inlet of the electrolyzer 2 so that the nitrate ions which it contains are reduced.

A portion of the liquid already treated by the electrolyzer 2 is brought from the electrolyzer outlet 6 of the latter to the inlet 8 of the electrolyzer 2 by means of a recycling conduit 5 in order to subject once again the already treated medium to an electrolysis in the presence of ionic zinc in order to further reduce the nitrate concentration of this medium.

In order to set the pH to a low value, the device according to the invention comprises a pH controller connected to the enclosure in which the electrolysis is conducted.

Additionally, the device comprises an electrodialyzer 3 and a unit for oxidizing ammonium ions 4, both mounted at the electrolyzer outlet 6 of the electrolyzer 2 in order to respectively treat the zinc in ionic form which was used during the electrolysis and the generated ammonium ions during this same electrolysis.

The electrodialyzer 3 allows zinc ion depletion of a portion of the liquid flowing out of the electrolyzer 2 on the one hand, which will be able to be discharged, and zinc ion enrichment of the other portion of the liquid which will as for it be reused as a source for providing zinc ions within the electrolyzer 2.

For this purpose, the device comprises a recycling conduit 7 connecting the outlet of the enrichment column of the electrodialyzer 3 to the inlet of the electrolyzer 2, as well as a conduit for discharging the treated effluent.

In order to control the zinc ion concentration of the electrolytic solution flowing through the electrolyzer, the device according to the invention comprises a controller which controls the opening of the valve for letting in the ionic zinc concentrated solution from the electrodialyzer 3.

The oxidation unit 4 used for treating the liquid flowing out of the electrolyzer 2, containing ammonium ions, one of the products of the conversion of the nitrate ions, comprises a source for providing an oxidizing agent and a means for controlling the pH.

The selected oxidizing agent is chlorine dioxide $ClO_2$ which reacts under controlled pH, with ammonium ions to be removed in order to reform nitrate ions which will be retreated in the electrolyzer 2.

In order to do this, the outlet of the oxidation unit for ammonium ions is connected through a conduit 9 to the inlet of the electrolyzer 2.

Thus, the device according to the invention operates in a closed loop and allows discharge of an effluent which not only observes nitrate and ammonium discharge standards but also zinc ion discharge standards.

In the following, further details are given on the operation of each of the significant units 2, 3, 4 of the device and on the experimental results obtained within these units and illustrating their efficiency.

Electrolyzer 2

A comparative study was conducted in order to observe the influence of zinc ions during an electrolysis, notably on the nitrate ions to be removed.

The technique retained for assaying the nitrate, nitrite and zinc ions are the following standardized techniques:

for $NO_3^-$: NF EN ISO 10304-1 (chromatography)
for $NO_2^-$: NF EN ISO 26777
for $Zn^{2+}$: NF EN ISO 11885

Figure 2:
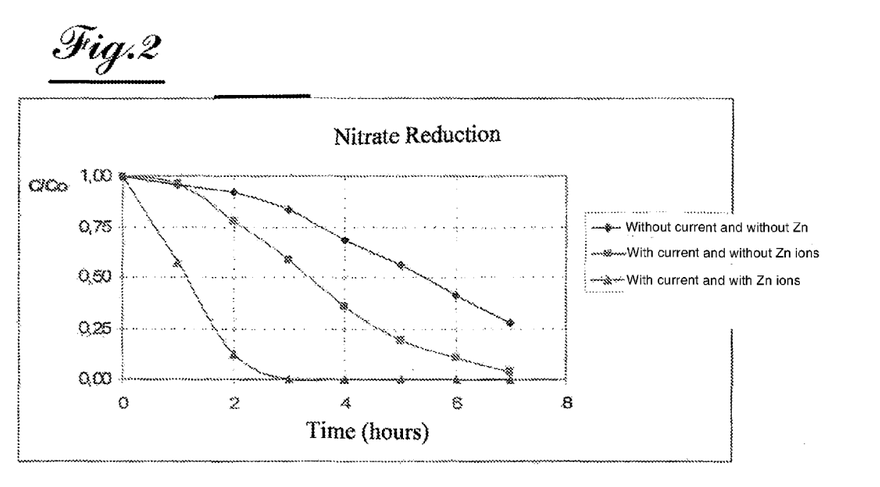
FIG. 2 illustrates the time courses of the nitrate ion concentration during three experiments conducted on a mother solution containing a known initial nitrate concentration in the presence of a zinc electrode, without any current applied on the electrode and initially without any zinc ions (curve with lozenges), with current and initially without zinc ions (curve with squares), with current and initially with zinc ions (curve with triangles)
Figure 3:
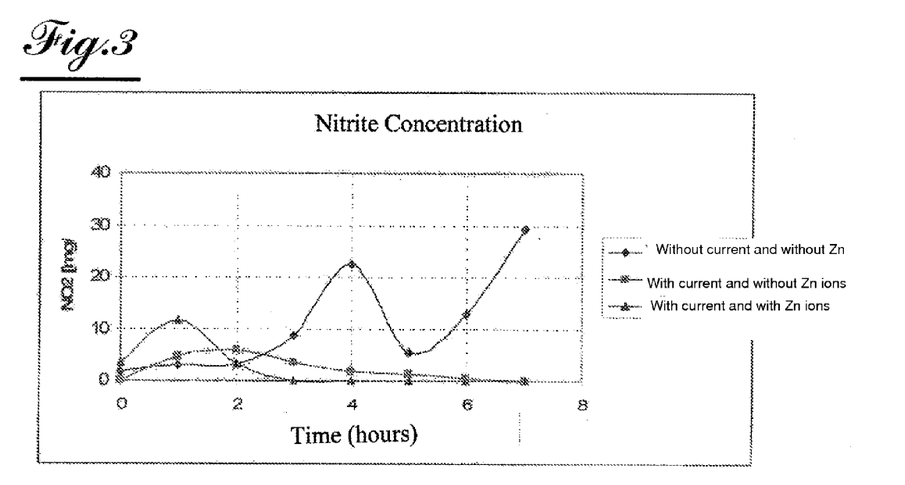
FIG. 3 is a figure analogous to that of FIG. 2, but which illustrates the time courses of the nitrite ion concentrations.
Figure 4:
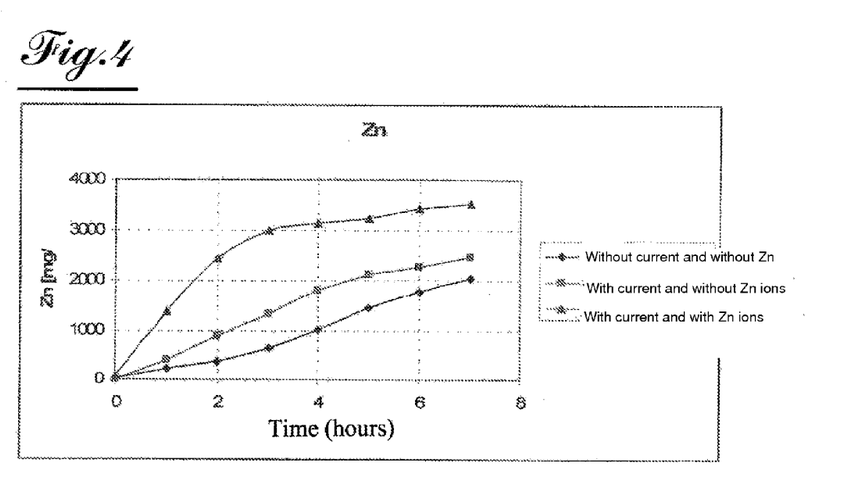
FIG. 4 is a figure similar to that of FIG. 2 but which defines the time courses of the zinc ion concentrations.

For this purpose, three experiments were conducted:

without any current and without any zinc ions (lozenges on FIGS. 2-4)

with current and without any zinc ions (squares in FIGS. 2-4)

with current and with zinc ions (triangles in FIGS. 2-4).

The experiments were conducted on a solution with a volume of 1 liter, initially containing 953 mg·$L^{-1}$ of nitrate ions with stirring at 400 rpm and a pH maintained around 3.

The electrodes used are an electrode in vitrified carbon and a zinc electrode (surface area of 20 $cm^2$).

The electrolytic solutions of each of these experiments were analyzed every hour for 7 hours in order to observe the time courses of the nitrate ion, nitrite ion and zinc ion contents.

These three time courses are grouped in Table 1 below for the three experiments above and respectively illustrated in the aforementioned FIGS. 2-4.

TABLE 1

|  | Without Electrical Current | | | With Electrical Current | | | With electrical current and $Zn^{2+}$ | | |
| --- | --- | --- | --- | --- | --- | --- | --- | --- | --- |
| Time (h) | $NO_3^-$ mg·$L^{-1}$ | $NO_2^-$ mg·$L^{-1}$ | $Zn^{2+}$ mg·$L^{-1}$ | $NO_3^-$ mg·$L^{-1}$ | $NO_2^-$ mg·$L^{-1}$ | $Zn^{2+}$ mg·$L^{-1}$ | $NO_3^-$ mg·$L^{-1}$ | $NO_2^-$ mg·$L^{-1}$ | $Zn^{2+}$ mg·$L^{-1}$ |
| 0 | 979 | 1.63 | 27.8 | 875 | <0.20 | 0.48 | 53 | 3.34 | 70.8 |
| 1 | 936 | 2.89 | 212 | 844 | 4.79 | 404 | 45 | 11.7 | 1391 |
| 2 | 900 | 3.26 | 374 | 680 | 5.91 | 890 | 16 | 3.23 | 2436 |
| 3 | 817 | 8.63 | 644 | 513 | 3.36 | 1330 | <10 | <0.20 | 2991 |
| 4 | 673 | 22.4 | 1024 | 315 | 1.8 | 1801 | <10 | <0.20 | 3133 |
| 5 | 548 | 5.34 | 1458 | 167 | 1.26 | 2127 | <10 | <0.20 | 3230 |
| 6 | 403 | 12.9 | 1768 | 93 | 0.43 | 2262 | <20 | <0.20 | 3434 |
| 7 | 274 | 29.4 | 2045 | 33 | 0.06 | 2461 | <20 | <0.20 | 3525 |
| $NH_4^+$ | 66 | | | 138 | | | 166 | | |

Upon reading FIG. 2, it is seen that the reduction in nitrate ions is faster when zinc ions are initially present in the electrolytic solution and when the electrolysis current is non-zero (curve with triangles).

In this case, the nitrate ion concentration becomes zero after three hours of electrolysis, whereas with an electrolysis current and without any zinc ions (curves with squares), only a low non-zero nitrate ion concentration may be attained (33 mg·L$^{-1}$) and only after 7 hours of electrolysis. In the case of the experiment without any current and without any zinc ions, even after 7 hours of electrolysis, 274 mg·L$^{-1}$ of nitrate ions remain (curve with lozenges).

Therefore, the initial presence of zinc ions in the electrolytic solution allows a reduction in the time required for reducing nitrate ions by more than twice as compared with the experiments without any zinc ions upon starting the electrolysis.

Additional experiments have shown that a $Zn_2^+$ concentration above 0.5 g·L$^{-1}$ was even more beneficial for reducing the nitrates.

Also, with these experiments it is possible to show that better results are reached with a relatively low pH, i.e. less than 5. According to the preferred embodiment, the pH is maintained between 2 and 5. More particularly, the pH is maintained around 3.

Other experiments also allowed study of the influences on the chemical and electrical yields of the various conducted electrolyses, of the nature of the metal salt present at the beginning of the electrolysis by using $Fe^{2+}$ or $ZN^{2+}$, of the nature of the background salt, by using NaCl or $Na_2SO_4$, as well as of the natures of the anodes and cathodes by using graphite, zinc or iron.

It should be noted that the chemical yield (E) results from the decrease of the nitrate ion concentration ($C_{out}$), calculated as a percentage of the initial concentration ($C_{in}$), which is calculated as follows:

$$E(\%) = \frac{C_{in} - C_{out}}{C_{in}} \times 100$$

The electric yield represents the percentage ratio of the theoretical amount of current, required for reducing nitrate ions into ammonia over the amount of consumed current.

The technique retained for assaying the nitrate ions during electrolysis, is spectrophotometry. This technique certainly detects much too high nitrate concentrations as compared with expected results on the samples of known concentration, but the nitrite ions do not in any way interfere in the measurements, unlike polarography for example. Further, this technique is easier to apply than polarography.

These results are illustrated in Table 2 below:

TABLE 2

Results of spectrophotometric analyses of various electrolyses.

| Electrodes | Medium | Electrolysis conditions | Chemical yield (%) | Electrical yield (%) |
|---|---|---|---|---|
| +: graphite<br>−: graphite | $KNO_3$ 10$^{-2}$M; NaCl 10$^{-2}$M<br>pH = 7 | I = 0.6 A; t = 6 h<br>U = 28 V | 3 | 37 |
| +: graphite<br>−: graphite | $KNO_3$ 10$^{-2}$M; $Na_2SO_4$ 10$^{-2}$M<br>pH = 7 | I = 0.6 A; t = 6 h<br>U = 28 V | 0 | 28 |
| +: graphite<br>−: graphite | $NH_4NO_3$ 10$^{-2}$M; NaCl 10$^{-2}$M<br>pH = 7; $Zn^{2+}$ 10$^{-2}$M | I = 0.9 A; t = 2 h<br>U = 26 V | 29 | 74 |
| +: graphite<br>−: graphite | $NH_4NO_3$ 10$^{-2}$M; $Na_2SO_4$ 10$^{-2}$M<br>pH = 7; $Zn^{2+}$ 10$^{-2}$M | I = 0.9 A; t = 2 h<br>U = 27.75 V | 20 | 74 |
| +: graphite<br>−: graphite | $NH_4NO_3$ 10$^{-2}$M; NaCl 10$^{-2}$M<br>pH = 4; $Fe^{2+}$ 5.10$^{-3}$M | I = 0.9 A; t = 2 h<br>U = 26 V | 29 | 74 |
| +: graphite<br>−: graphite | $NH_4NO_3$ 10$^{-2}$M; NaCl 10$^{-2}$M<br>pH = 7; $Fe^{2+}$ 5.10$^{-3}$M | I = 0.9 A; t = 2 h<br>U = 27.75 V | 3 | 74 |
| +: iron<br>−: graphite | $NH_4NO_3$ 10$^{-2}$M; NaCl 10$^{-2}$M<br>pH = 7 | I = 4 A; t = 2 h<br>U = 27.5 V | 24 | 17 |
| +: iron<br>−: graphite | $NH_4NO_3$ 10$^{-2}$M; NaCl 10$^{-2}$M<br>pH = 4; $Fe^{2+}$ 5.10$^{-3}$M | I = 1 A; t = 2 h<br>U = 17 V | 93 | 30 |
| +: iron<br>−: graphite | $KNO_3$ 10$^{-2}$M; NaCl 10$^{-2}$M<br>pH = 4; $Fe^{2+}$ 5.10$^{-3}$M | I = 1.3 A; t = 4 h 30<br>U = 26.5 V | 97 | 23 |
| +: iron<br>−: graphite | $KNO_3$ 10$^{-2}$M; $Na_2SO_4$ 10$^{-2}$M<br>pH = 4; $Fe^{2+}$ 5.10$^{-3}$M | I = 1.4 A; t = 4 h 30<br>U = 25.5 V | 95 | 21 |
| +: graphite (2)<br>−: graphite (2) | $KNO_3$ 10$^{-2}$M; NaCl 10$^{-2}$M<br>pH = 4; $Fe^{2+}$ 5.10$^{-3}$M | I = 0.8 A; t = 2 h 45<br>U = 24 V | 22 | 61 |
| +: graphite (2)<br>−: graphite (2) | $KNO_3$ 10$^{-2}$M; NaCl 10$^{-2}$M<br>pH = 4; $Zn^{2+}$ 10$^{-2}$M | I = 0.4 A; t = 4 h<br>U = 29 V | 85 | 84 |
| +: graphite (2)<br>−: graphite (2) | $KNO_3$ 10$^{-2}$M; $Na_2SO_4$ 10$^{-2}$M<br>pH = 4; $Zn^{2+}$ 10$^{-2}$M | I = 0.4 A; t = 4 h<br>U = 28.75 V | 93 | 84 |
| +: graphite (3)<br>−: zinc (3) | $KNO_3$ 10$^{-2}$M; $Na_2SO_4$ 10$^{-2}$M<br>pH = 4 | I = 0.6 A; t = 3 h 30<br>U = 29 V | 96 | 64 |
| +: graphite<br>−: zinc | $KNO_3$ 10$^{-2}$M; NaCl 10$^{-2}$M<br>pH = 4 | I = 1 A; t = 6 h<br>U = 28 V | 79 | 22 |
| +: graphite<br>−: zinc | $KNO_3$ 10$^{-2}$M; $Na_2SO_4$ 10$^{-2}$M<br>pH = 4 | I = 0.8 A; t = 2 h<br>U = 21 V | 11 | 67 |
| +: graphite<br>−: zinc | $KNO_3$ 10$^{-2}$M; $Na_2SO_4$ 10$^{-2}$M<br>pH = 4 | I = 0.8 A; t = 6 h<br>U = 28 V | 79 | 28 |
| +: graphite<br>−: zinc | $NH_4NO_3$ 10$^{-2}$M; NaCl 10$^{-2}$M<br>pH = 4 | I = 1 A; t = 6 h<br>U = 21 V | 93 | 22 |
| +: graphite<br>−: graphite | $KNO_3$ 10$^{-2}$M; NaCl 10$^{-2}$M<br>pH = 7; zinc powder | I = 0.6 A; t = 5 h 30<br>U = 26 V | 60 | 41 |

According to Table 2, with these experiments it was possible to shown that:

the averages of the chemical yields of the conducted electrolyses by only varying the background salt are quasi similar. The nature of the background salt therefore does not seem to influence the reaction, reduction of the nitrate on an iron cathode can only be carried out at an acid pH and if $Fe^{2-}$ ions have been introduced beforehand into the solution in order to initiate the reaction (lines 8-10), by using a zinc cathode without any zinc ions in solution added at the beginning of the electrolysis (line 14) it is possible to obtain very good chemical yield and average electrical yield, on the other hand, by using a zinc metal salt at the beginning of the electrolysis, it is possible to reduce the nitrate ions, both with very good chemical yield and very good electrical yield (lines 12 and 13), Consequently, with the conducted experiments it is possible to show that the reduction of the nitrate ions in the aqueous solution may be achieved. Selective electrolytic denitration is therefore possible.

To do this, an acid medium is required in all cases.

The best chemical and electrical yields were obtained by indirect reduction via $Zn^{2+}$ ions initially present in the electrolytic solution and an acid pH.

Thus, an electrolyzer cooperating with a source of metal salt is suitable for forming the basis of the treatment device according to the invention.

But, at the same time as the reduction in the amounts of nitrate ions, made fast because of the use of zinc ions at the beginning of the electrolysis, the amount of zinc ions in the solution increases and reaches 3525 mg·$L^{-1}$ after seven hours of electrolysis with current and with zinc ions at the beginning of the electrolysis (FIG. 4, curve with squares).

In order to reduce this zinc ion concentration at the outlet of the device according to the invention, the latter is provided with the aforementioned electrodialyzer in order to form a zinc ion depleted solution which will be discharged through a discharge conduit 10 illustrated in FIG. 1 and a zinc ion rich solution which will be recycled within the device and upstream from the electrolyzer 2.

Electrodialyzer 3

In order to study the feasibility of the reduction in the amount of zinc ions within an effluent containing them, an electrodialyzer with three tanks was filled with a solution having a known zinc ion concentration, independently of the electrolyzer 2.

This electrodialyzer is of the batch type, and provided with a metal salt enrichment column, with two metal salt depletion columns connected to a conduit for discharging the treated liquid medium and with a zinc electrode.

The solution with a known zinc ion concentration is prepared with zinc chloride and its temperature is maintained at room temperature.

An electric field is applied and 4 mL samples of solution are taken at regular time increments.

The pH and the conductivity of the medium were tracked continuously.

Stirring is accomplished by circulation pumps connected to each compartment.

Figure 5:
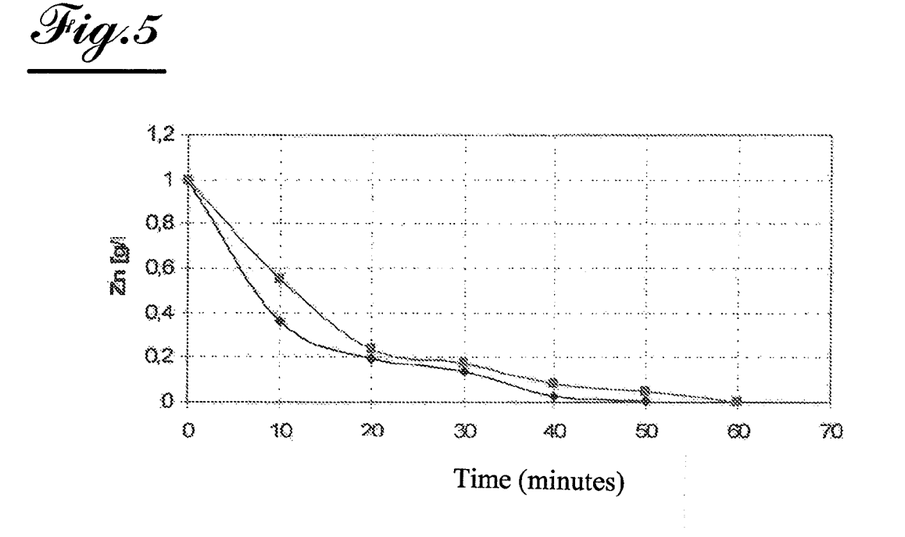
FIG. 5 illustrates the time courses of the zinc ion concentrations of two depletion columns of the electrodialyzer of the device of FIG. 1.
Figure 6:
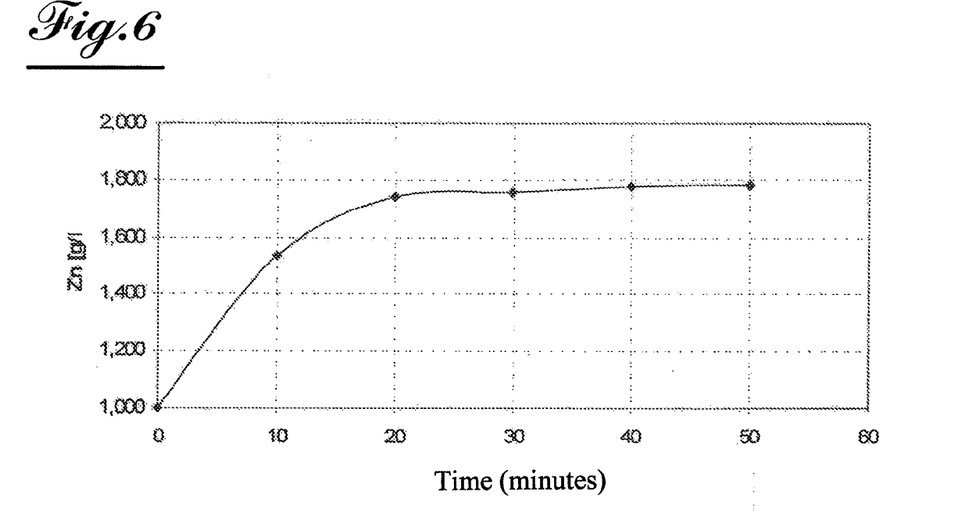
FIG. 6 illustrates the time courses of the zinc ion concentrations of the enrichment column of the electrodialyzer of FIG. 1.

The results obtained during the electrodialysis within the depletion columns are illustrated in FIG. 5 and the results obtained in the enrichment column are visible in FIG. 6.

These results clearly show the possibility of attaining in the enrichment columns the $Zn^{2+}$ discharge standards since, at the latest, after 60 min, a concentration below the discharge standard (5 mg·$L^{-1}$) is attained (FIG. 5).

Further, they show the possibility of concentrating in the enrichment column the $Zn^{2+}$ since their concentration is multiplied by almost 1.8 after 20 min.

Therefore, by using an electrodialyzer at the outlet of the electrolysis enclosure, it will be possible to discharge an effluent observing in addition to the nitrate ion discharge standards, the zinc ion discharge standards of 5 mg·$L^{-1}$.

The recycling of an effluent which is more concentrated in $Zn^{2+}$ than the solution entering this electrodialyzer, will be redirected to the inlet of the electrolyzer.

The thereby formed circulation loop of the zinc ions is quasi self-contained, so as to limit the amounts of zinc ions required for treating the nitrates.

Oxidation Unit 4

Reduction of the nitrate and nitrite ions in the electrolyzer generates the formation of ammonium ions which are not toxic as such but which may be converted into ammonia which itself is toxic.

In order to overcome this problem, the device according to the invention is provided with an oxidation unit mounted at the outlet of the electrolysis enclosure in order to oxidize the ammonium ions of the effluent.

When $ClO_2$, for example produced by mixing HCl from the storage unit 13 and NaClO from the storage unit 12, introduced by the oxidant solution inlet 11, is added to a solution comprising ammonium ions at a given time in order to attain a concentration close to 5% by volume, a 95% reduction of the amount of ammonium ions is observed after 30 seconds, and after 5 minutes a 98% reduction.

It should be noted that the oxidant concentration plays a significant role as regards reduction but an insignificant one as regards kinetics.

Further, it was observed that the optimum pH for oxidizing the ammonium ions is close to 2.

Consequently, a solution containing ammonium ions may be treated with $ClO_2$ at a low pH in order to remove almost 100% of these ammonium ions.

One of the products of the oxidation of these ammonium ions are nitrate ions.

Within the device according to the invention, these nitrate ions may ideally be redirected towards the inlet of the electrolysis enclosure 2 in order to be removed therein.

The oxidation unit integrated to the device according to the invention will thus comprise an inlet for liquid communicating with the outlet of the electrolysis enclosure, an outflow of liquid loaded with nitrate, an inflow of an oxidizing agent called chlorine dioxide ($ClO_2$), and a means for mixing the liquid passing through the oxidation unit with the oxidizing agent.

Further, the pH of the liquid passing through the oxidation unit is maintained close to 2 via the pH marked as 15 in FIG. 1 and the HCl storage unit 13.

The outlet for liquid from the oxidation unit is connected to the inlet of the electrolysis enclosure with view to treating this liquid by electrolysis.

The oxidation unit described above is ideally integrated within the device according to the invention since it allows treatment of the effluents at the outlet of the electrolyzer in order to deplete their ammonium ions and is connected to the inlet of the electrolyzer 2 so that the latter removes the reformed nitrates.

However, this oxidation unit may be used independently of the electrolyzer of the device according to the invention, for treating any effluent loaded with ammonium ions.

The selection of $ClO_2$ as an oxidizing agent is particularly suitable for oxidizing ammonium ions since on the one hand, this agent has strong oxidizing power towards the ammonium ions and thus reacts rapidly and naturally with the latter, and on the other hand it does not react with zinc ions and therefore remains in solution for treating the ammonium ions.

The device according to the invention, provided with the electrolyzer, the electrodialyzer and the oxidation unit as described above, may advantageously be controlled by a stand-alone control system, capable of handling the openings of the control valves 14 of the connecting conduit between these three elements and of the conduit for supplying the medium to be treated 16, depending on the concentrations of nitrate ions, zinc ions and ammonium ions measured at the outlet of the electrolyzer, the electrodialyzer and the oxidation unit, in order to optimize the treatment of the liquid medium and to purify the treated effluent.

2. Second Embodiment of the Treatment Device

The second embodiment of the device for treating via a mixed chemical electrochemical route a liquid medium loaded with nitrates according to the invention is illustrated in FIG. 6.

It essentially differs from the first embodiment of FIG. 1 by the fact that the working solution, originating from the mixture of the effluent to be treated with a zinc ion enriched solution, circulates from bottom to top within a container positioned vertically and comprising an alternation of electrolysis compartments and oxidation compartments in the presence of $ClO_2$.

Figure 7:
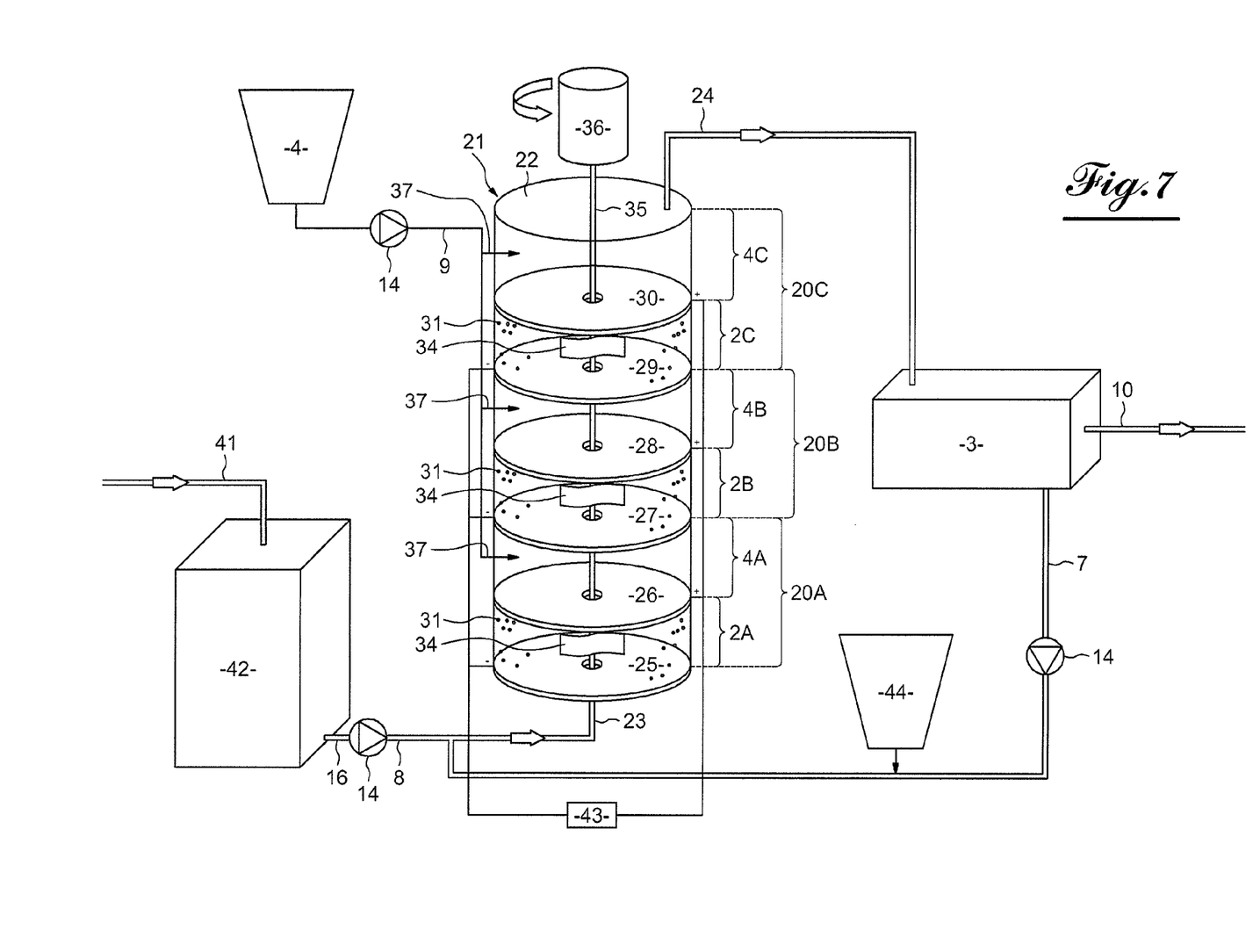
FIG. 7 illustrates a bloc diagram of a second embodiment of the device for treating via a mixed chemical electrochemical route a liquid medium loaded with nitrates according to the invention, provided with several electrolysis compartments and oxidation compartments.

The first compartment through which the working solution passes during its progress within the nitrate treatment column is an electrolysis compartment 2A, in order to reduce a portion of the nitrate ions which it contains, which are transformed into ammonium ions, into nitrogen and nitrogen oxides NOx.

The second compartment through which passes this solution is an oxidation compartment 4A in the presence of $ClO_2$ so that the ammonium ions formed within the underlying electrolysis compartment 2A are oxidized and converted into nitrate ions. Since the oxidation agent used ($ClO_2$) has strong oxidizing power, the whole of the ammonium atoms reaching this oxidation compartment is converted into nitrate ions.

The third compartment through which the solution then passes is again an electrolysis compartment 2B, in order to reduce the nitrate ions which had not been reduced during the electrolysis conducted in the first electrolysis compartment 2A on the one hand, and to reduce the nitrate ions produced within the underlying oxidation compartment 4A on the other hand.

The compartments 4B, 2C, 4C through which the solution then passes, observe the oxidation compartment/electrolysis compartment alternation and always allow reduction of the nitrates which have not been reduced in the underlying electrolysis compartments, and that of the nitrates produced within the underlying oxidation compartments.

The last compartment crossed by the solution is an oxidation compartment 4C.

The benefit from having the working solution be subject to an alternation of electrolyses and oxidations in the presence of $ClO_2$, in a vertical column is the following:

Experiments conducted for the needs of the invention have shown that when the working solution crosses a first electrolysis compartment in the presence of zinc ions and then the overlying oxidation compartment in the presence of ammonium ions, the solution flowing out from the oxidation compartment comprises half fewer nitrate ions.

Consequently, an electrolysis and oxidation compartment <<stage>> as marked with 20 in FIG. 7, allows a 50% reduction of the inflowing nitrate ions.

By multiplying these stages 20, it is possible to remove the nitrate ions all the more so.

Further, by means of this particular alternating vertical arrangement, the gas species (notably nitrogen oxides $NO_x$) produced during electrolysis at stage N are dissolved in the liquid overhanging this stage (Henry's law).

Especially, this vertical arrangement allows dissolution of a particularly undesirable gas species formed by dichlorine formed within the electrolysis compartments 2A, 2B, 2C because of the presence of $ClO_2$ in the solution passing through the column for treating nitrates 21.

Indeed, although $ClO_2$ is injected at the oxidation compartments 4A, 4B, 4C, this $ClO_2$ is again found at the electrolysis compartments 2A, 2B, 2C since the solution circulates from one compartment to another. At these electrolysis compartments, $ClO_2$ also undergoes reduction which produces dichlorine $Cl_2$. But by means of the alternating arrangement of the electrolysis and oxidation compartments, the dichlorine bubbles 31 formed within an electrolysis compartment 2A, 2B, 2C move upwards by buoyancy at the corresponding overlying oxidation compartment 4A, 4B, 4C where they are dissolved in the liquid contained in this compartment.

The detail of the constitutive elements of the device according to the second embodiment of the invention is now given.

In the illustrated example, the nitrate treatment column 21 is formed by a cylindrical tube 22 fed with a working solution through a conduit 23, opening out in its lower portion and delivering from its upper portion the treated solution through a conduit 24, the solution circulation being performed from bottom to top.

This tube is separated into three stages 20A, 20B, 20C each divided into an electrolysis compartment and a compartment for oxidation of ammonium ions as described below.

Electrolysis Compartments 2A, 2B, 2C of FIG. 7

Each electrolysis compartment 2A, 2B, 2C is delimited by two electrode-forming circular horizontal plates 25, 26, 27, 28, 29, 30, positioned concentrically along the axis of the column, between which a potential difference is imposed by means of a power supply source 43.

In the example illustrated in FIG. 7, the lower plates 25, 27 and 29 of the electrolysis compartments 2 are brought to a potential below the one of the overlying plate 26, 28, 30.

A rotary stirrer 34 actuated by means of an axle 35 driven by a motor 36 is positioned between two plates of an electrolysis compartment 25, 26. This axle 35 coincides with the axis of the column 21 and crosses the plates 25, 26 in their thickness through an aperture 32.

The passage of the solution from one electrolysis compartment to the overlying oxidation compartment is performed through this aperture 32.

Because of the potential difference existing between both plates 25, 26 of a same electrolysis compartment, the solution which passes between the latter undergoes electrolysis during which the nitrate ions are for the most part reduced.

Nitrogen $N_2$, ammonium ions, nitrogen oxides are included among the products of this electrolysis.

And because of the presence of $ClO_2$ in the column 21, dichlorine $Cl_2$ is also included.

Oxidation Compartments 4A, 4B, 4C of FIG. 7

The first 4A and second 4B oxidation compartments are each delimited by the upper plate 26, 28 of the underlying electrolysis compartment and by the lower plate 27, 29 of the overlying electrolysis compartment.

Between both of these plates, $ClO_2$ is introduced by means of a tube connected to a $ClO_2$ source 4.

The plates 26 and 27 on the one hand and 28 and 29 on the other hand which delimit the oxidation compartments 4A, 4B are subject to a potential difference since the plates of the column are alternately charged negatively and positively. This potential difference is moreover equal to that imposed within each electrolysis compartment.

These plates 26, 27 and 28, 29 thereby impose electrolysis to the solution which passes through them.

The compartments 4A, 4B are therefore oxidation-electrolysis compartments.

On the contrary, according to an embodiment of the power supply of the plates of the column, not shown, both plates delimiting an oxidation compartment have identical potentials so that these compartments are not the centre of an electrolysis, but only of an oxidation.

The third oxidation compartment 4C is delimited by the upper plate 30 of the underlying electrolysis compartment 2C and by the upper portion of the column.

Figure 8:
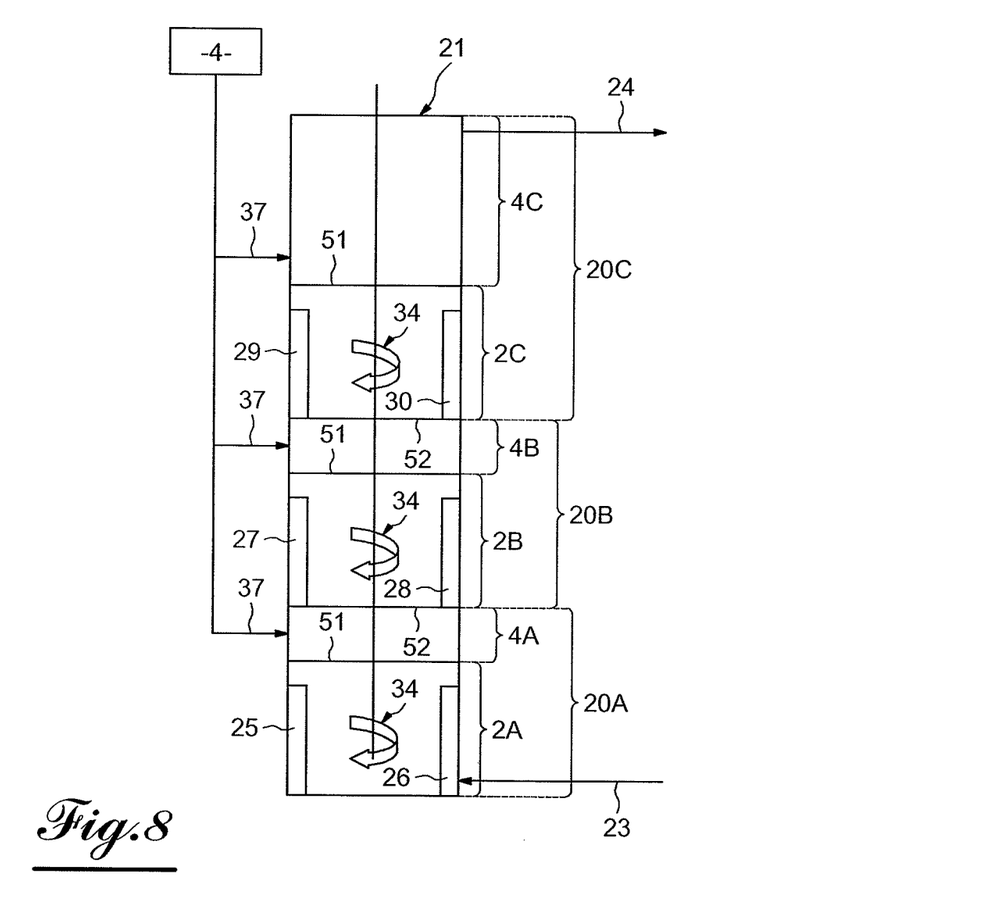
FIG. 8 illustrates an alternative embodiment of the electrolysis compartments of the device of FIG. 7.

Electrolysis Compartments 2A, 2B, 2C of FIG. 8

According to an alternative arrangement of the electrodes of the electrolysis compartments, illustrated in FIG. 8, the latter are not circular and horizontal but rectangular and vertical.

Two electrodes of this type 25, 26; 27, 28; 29, 30 are positioned facing each other and each run along the wall of the column 21. A potential difference is imposed between both electrodes of a same compartment.

A stirrer 34 is further interposed between both electrodes.

Oxidation Compartments 4A, 4B, 4C of FIG. 8

The first 4A and second 4B oxidation compartments of the alternative embodiment of FIG. 8, are delimited by two plates 51, 52 between which the strong oxidizer $ClO_2$ is injected. These plates 51, 52 are provided with an aperture for letting through the axis of rotation of the stirrers 34 of the electrolysis compartments, which also provides the passage for the solution from or towards an electrolysis compartment.

The last oxidation compartment 4C is delimited in its lower portion by a plate 51 and in its upper portion by the top of the column 21.

The solution flowing out of the column for treating nitrates 21, according to the alternative embodiment of FIG. 7 or 8, which comprises three stages, contains about 88% fewer nitrate ions than the solution flowing into this column.

However this solution contains a large concentration of zinc ions above the discharge standards. It is redirected towards an electrodialyzer 3 as described earlier, in order to prepare from this solution a zinc ion enriched liquid which will be recycled and a zinc ion depleted liquid observing the discharge standards, which will be discharged without any further treatment.

The zinc ion enriched liquid is redirected towards the inlet of the nitrate treatment column 21 by means of the conduit 7 and the associated control valve 14.

If necessary, an adjustment of the zinc ions may be carried out by means of a reservoir provided for this purpose 44 mounted on the recycling conduit 7.

In the following an exemplary embodiment is given with a column comprising two treatment stages:

Initial Solution

Actual solution from green house draining, concentration of nitrate ions: 150 mg·$L^{-1}$ Working Solution Concentration of zinc ions: 500 mg·$L^{-1}$ Electrolysis Compartments Potential difference imposed between two electrodes defining an electrolysis compartment: 2V Stirring rate: 300 rpm pH: 3.80

Oxidation Compartments $ClO_2$: 200-205 g per gram of nitrate ions to be treated Solution Flowing Out of the Nitrate Treatment Column Concentration of nitrate ions: 7.6 mg·$L^{-1}$ Concentration of ammonium ions: 11.5 mg·$L^{-1}$ (7 mg·$L^{-1}$ when 230-240 grams of $ClO_2$ per gram of nitrate ions to be treated are used)

Decrease of the nitrate and ammonium ions relatively to the initial solution: 87%

Temperature: room temperature

Electric power required per gram of treated nitrate ions: 21.5 Watts per gram of treated nitrates.

The device according to the invention, provided with an effluent inlet 41 attached to the tank 42 of solution to be treated, with the nitrate treatment column 21, with the $ClO_2$ storage container and with the electrodialyzer 3 as described above, may advantageously be controlled by a stand-alone control system, capable of handling the openings of the control valves 14 of the connecting conduits between these four elements, depending on the concentrations of nitrate ions, zinc ions, $ClO_2$ and ammonium ions measured within the circuit, in order to optimize the treatment of the liquid medium and to attain the discharge standards in effect.

Further, it has various advantages:

the number of stages of the column for treating nitrates 21 may be adapted depending on the concentration of nitrate ions of the solution to be treated in order to attain a desired nitrate concentration at the column outlet, since it is possible to determine a percentage of decrease of nitrate ions carried out by a stage, also, the flow rate of the solution passing through the column may be adapted depending on the desired nitrate concentration at the column outlet 21, in order to e.g. increase the dwelling time of the solution within the column, another way of proceeding in order to attain a desired nitrate concentration at the column outlet is to dilute the solution to be treated within the tank 42, the injection of $ClO_2$ may be adapted depending on the flow rate of the solution and/or depending on the compounds other than the nitrate ions present in the initial solution. Typically, for a synthesis solution, only including nitrate ions, about 200 mg of $ClO_2$ per gram of nitrate ions are sufficient for oxidizing the ammonium ions originating from the electrolysis of the nitrate ions. But for an actual draining solution, notably containing iron ions and anions other then nitrate ions, 230-240 mg of $ClO_2$ per gram of nitrates will then be necessary, the amount of zinc ions required for accelerating the reduction of the nitrate ions is not very affected by the concentration of these ions in the solution to be treated. Indeed, experiments have demonstrated that the same concentration of zinc ions (500 mg·$L^{-1}$) was also efficient for accelerating reduction of the nitrate ions contained in a solution of 150 mg·$L^{-1}$, as for solutions from 600 mg·$L^{-1}$ to 1 g·$L^{-1}$, which allows limitation of the consumption of these ions even for solutions which are more concentrated in nitrate ions, the height of the liquid overhanging each electrolysis compartment may also be adapted depending on the gas evolvement observed within these electrolysis compartments in order to attain complete dissolution of these gases, the relatively low temperature (room temperature) of the solution covering the column slows down precipitation of the iron ions in the form of complexes and also evolvement of chlorine.

The invention claimed is:

1. A method for treatment of a liquid medium containing nitrates, comprising
forming an electrolytic solution by adding a zinc metal salt to said liquid medium, wherein the zinc ion concentration in the electrolytic solution is at least 70.8 mg/L,
electrolyzing the electrolytic solution in an electrolyzer wherein the electrolytic solution is at a pH not exceeding 5, and then
forming an effluent solution that concentrates the zinc metal salt by electrodialyzing a solution output by the electrolyzing step.

2. The method according to claim 1, wherein the concentration of the zinc metal salt is larger than $0.5 \, g \cdot L^{-1}$ before the electrolyzing step.

3. The method according to claim 1, wherein the pH of the electrolytic solution is between 2 and 5.

4. The method according to claim 1, wherein the effluent solution is recycled to the electrolyzer and undergoes the electrolyzing step.

5. The method according to claim 4, wherein an output of the electrolyzing step undergoes an oxidizing step and an output of the oxidizing step is recycled to the electrolyzer and undergoes the electrolyzing step.

6. The method according to claim 1, wherein the electrolytic solution further comprises $KNO_3$.

7. The method according to claim 1, wherein the electrolytic solution further comprises $Na_2SO_4$.

8. The method according to claim 1, wherein the electrolytic solution further comprises NaCl.

9. A method for treatment of a liquid medium containing nitrates, comprising
forming an electrolytic solution by adding a zinc metal salt to said liquid medium, wherein the zinc ion concentration in the electrolytic solution is at least 70.8 mg/L,
electrolyzing the electrolytic solution in an electrolyzer wherein the electrolytic solution is at a pH not exceeding 5, and then
forming an effluent solution that is demineralized with respect to zinc metal salt by electrodialyzing a solution output by the electrolyzing step.

10. The method according to claim 9, wherein the concentration of the zinc metal salt is larger than $0.5 \, g \cdot L^{-1}$ before the electrolyzing step.

11. The method according to claim 9, wherein the pH of the electrolytic solution is between 2 and 5.

12. The method according to claim 9, wherein the electrolytic solution further comprises $KNO_3$.

13. The method according to claim 9, wherein the electrolytic solution further comprises $Na_2SO_4$.

14. The method according to claim 9, wherein the electrolytic solution further comprises NaCl.

15. A method for treatment of a liquid medium containing nitrates, comprising
forming an electrolytic solution by adding a zinc metal salt to said liquid medium, wherein the zinc ion concentration in the electrolytic solution is at least 70.8 mg/L,
electrolyzing the electrolytic solution in an electrolyzer while at pH not exceeding 5, then
oxidizing the electrolytic solution in the presence of an oxidizing agent,
each electrolyzing step conducted within an electrolysis compartment,
each oxidizing step conducted within an oxidizing compartment,
repeating the electrolyzing step and oxidizing step in an additional electrolysis compartment and additional oxidizing compartment respectively,
wherein the electrolysis compartment is located below and overlaps the oxidizing compartment directly above it,
wherein the passage of the electrolytic solution is from the lowest electrolysis compartment to the highest oxidizing compartment, and then
the electrolytic solution undergoes an electrodialyzing step.

16. The method according to claim 15, wherein the number of repetitions of the electrolyzing step and oxidizing step is dependent on nitrate ion concentration of the electrolytic solution.

17. The method according to claim 15, wherein the oxidizing step further comprises adding chlorine dioxide.

18. The method according to claim 17, wherein the electrolytic solution of the oxidizing step is at a pH of 2 to 5.

* * * * *